O. D. MILLS,
Boxes for Propagating Plants.
No. 152,758. Patented July 7, 1874.
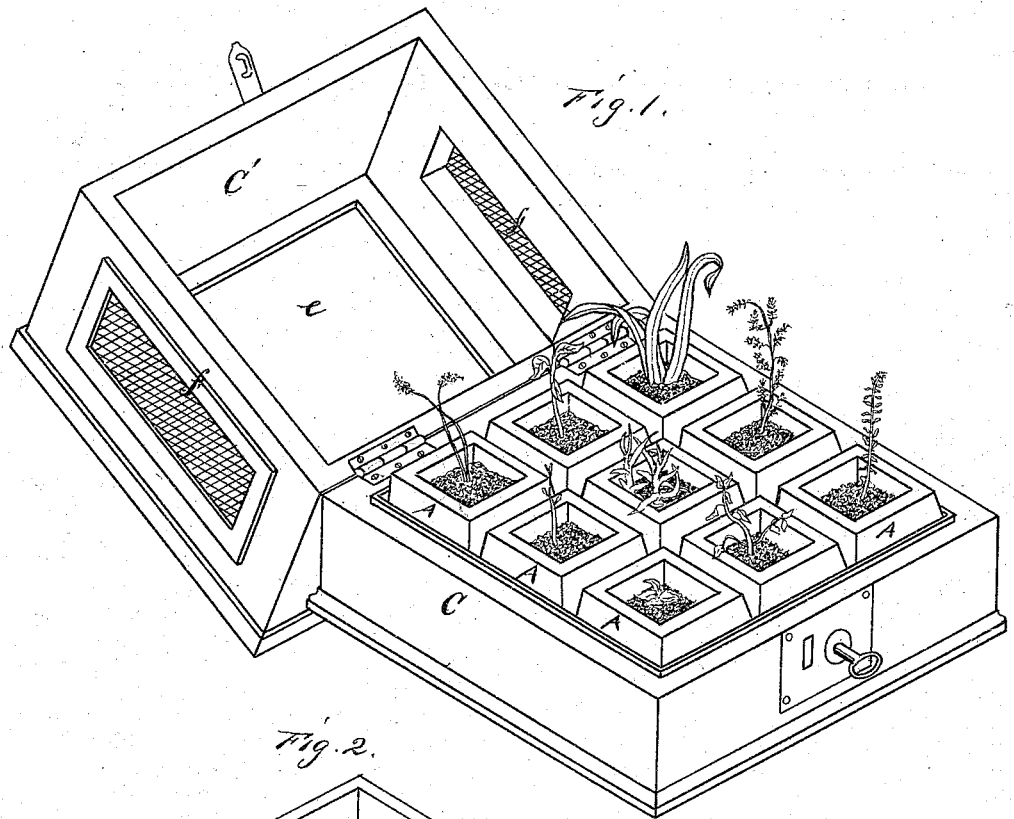
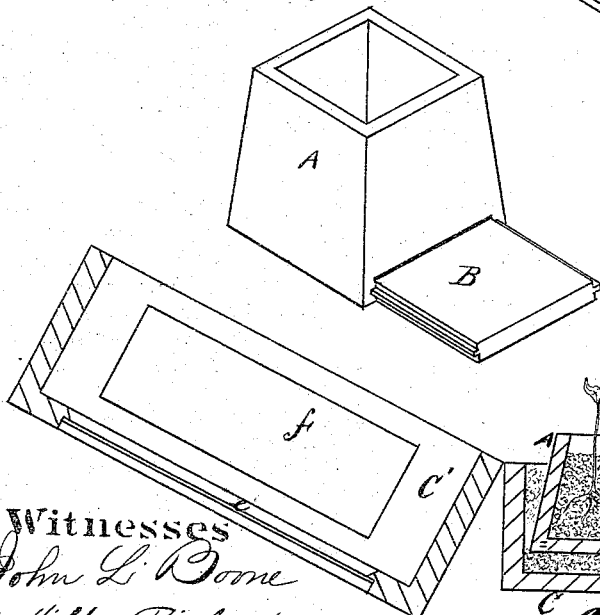
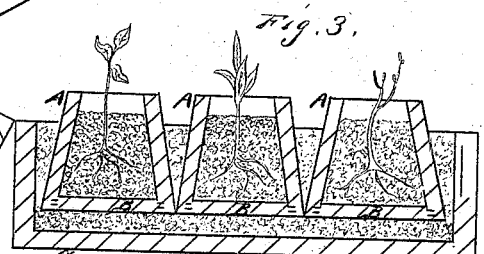

UNITED STATES PATENT OFFICE.

OBED D. MILLS, OF WATSONVILLE, CALIFORNIA.

IMPROVEMENT IN BOXES FOR PROPAGATING PLANTS.

Specification forming part of Letters Patent No. 152,758, dated July 7, 1874; application filed December 15, 1873.

*To all whom it may concern:*

Be it known that I, OBED DURRILL MILLS, of Watsonville, Santa Cruz county, State of California, have invented an Improved Box and Case for Propagating and Transplanting Plants; and I do hereby declare the following description and accompanying drawings are sufficient to enable any person skilled in the art or science to which it most nearly appertains to make and use my said invention or improvement without further invention or experiment.

My invention relates to an improved box for propagating plants, in which the plants may be transported without affecting their growth, and from which the earth and plants may be safely removed.

In order to more fully explain my invention, reference is had to the accompanying drawing, forming a part of this specification, in which—

Figure 1 is a perspective view of a series of my boxes. Fig. 2 is an enlarged view of one box, showing its slide. Fig. 3 is a sectional elevation.

A represents a shrub or flower box. This box I make with inclining sides, so that it will be larger at the bottom than at the top.

In order to permit of the removal of the plant, I provide the box with a sliding bottom, B, which can be removed at pleasure.

Usually I shall make these shrub or propagating boxes quite small—say, two or three inches square—so that each box will conveniently accommodate a single plant. C C′ is a large box, which is made in two parts, so that one part, C, serves as a bottom, while the other part, C′, serves as a lid or cover. These two parts are hinged together at one side, so that they can be opened or closed at will, and a lock may be applied, so that the two parts, when closed, can be locked together. The bottom or lower part C is intended to contain a small quantity of earth or sand, upon which two or more of my shrub or propagating boxes, A, are placed until the box is filled. The upper part C′ is of sufficient height to permit the shrub or flower to grow several inches in height. In the top part C′ I place a glass window, e, and upon one or more of its sides I make openings f, which I cover by wire screens or other perforated material, through which air can pass into the interior of the box or case.

My propagating-box A is employed in much the same manner that the ordinary tree or shrub box is used. The tapering sides and removable bottom permit of the removal of the earth and plant in a body without disturbing the soil about the roots of the plant. The bottom being removed, a slight tap against the sides of the box loosens the earth, and as the box is largest at the bottom the earth will readily drop out in a mass.

In transporting plants a number of the small boxes A, with the plants, are placed in the transporting-case C C′, and sponge or other fibrous material is packed closely about and between them. The packing material and bottom covering of sand are then saturated with water, and the case closed and locked.

By this means plants and flowers can be shipped long distances without stopping their growth or danger of injury.

I am aware that flower-pots have been made with removable bottoms, as shown in patent to M. Ludlum, March 1, 1870; and, therefore, I do not claim, broadly, making propagating-boxes with removable bottoms.

Having thus described my invention, what I claim, and desire to secure by Letters Patent, is—

The rectangular propagating-box A, constructed with inclining sides, as described, and provided with the removable sliding bottom B, substantially as and for the purpose set forth.

In witness whereof I hereunto set my hand and seal.

OBED DURRILL MILLS. [L. S.]

Witnesses:
    A. CRAIG,
    JAS. L. HALSTED.